United States Patent
Ziegenfus et al.

(10) Patent No.: US 7,350,960 B2
(45) Date of Patent: Apr. 1, 2008

(54) DUAL FLIGHT ROTORS FOR CONTINUOUS MIXER ASSEMBLY

(75) Inventors: Kelly A Ziegenfus, Jim Thorpe, PA (US); H. Slayton Altenburg, Tamaqua, PA (US); Donald E. Woodring, Tamaqua, PA (US); Harold L. Schafer, Jr., Lehighton, PA (US); James Hower, New Ringgold, PA (US)

(73) Assignee: Tech. Process & Engineering, Inc., Lehighton, PA (US)

(*) Notice: Subject to any disclaimer, the term of this patent is extended or adjusted under 35 U.S.C. 154(b) by 125 days.

(21) Appl. No.: 10/885,392

(22) Filed: Jul. 7, 2004

(65) Prior Publication Data

US 2006/0007777 A1    Jan. 12, 2006

(51) Int. Cl.
*B29B 7/46* (2006.01)

(52) U.S. Cl. .............................. 366/88; 366/83

(58) Field of Classification Search .......... 366/79, 366/81, 83–86, 88–90, 297–301, 318–324, 366/331; 425/204, 208, 209
See application file for complete search history.

(56) References Cited

U.S. PATENT DOCUMENTS

| | | | | |
|---|---|---|---|---|
| 3,154,808 A | * | 11/1964 | Ahlefeld, Jr. et al. | 366/76.6 |
| 3,239,878 A | * | 3/1966 | Ahlefeld, Jr. et al. | 366/77 |
| 3,565,403 A | * | 2/1971 | Matsuoka | 366/84 |
| 3,700,374 A | * | 10/1972 | Matsuoka et al. | 366/77 |
| 3,764,118 A | * | 10/1973 | Matsuoka | 366/84 |
| 3,802,670 A | * | 4/1974 | Okada et al. | 366/77 |
| 3,829,067 A | * | 8/1974 | Matsuoka | 366/81 |
| 4,310,251 A | * | 1/1982 | Scharer et al. | 366/77 |
| 4,332,481 A | * | 6/1982 | Inoue et al. | 366/84 |
| 4,380,397 A | * | 4/1983 | Hashizume et al. | 366/77 |
| 4,542,992 A | * | 9/1985 | Markhart | 366/300 |
| 4,681,457 A | * | 7/1987 | Orimo et al. | 366/84 |
| 4,707,139 A | * | 11/1987 | Valenzky et al. | 366/77 |
| RE34,172 E | * | 2/1993 | Gwinn et al. | 366/85 |
| 5,259,671 A | * | 11/1993 | Lowe et al. | 366/83 |
| 5,382,089 A | * | 1/1995 | Mosher | 366/83 |
| 5,487,602 A | * | 1/1996 | Valsamis et al. | 366/81 |
| 5,855,432 A | * | 1/1999 | Inoue et al. | 366/322 |

(Continued)

FOREIGN PATENT DOCUMENTS

GB    2119271    * 11/1983

(Continued)

OTHER PUBLICATIONS

Lowenherz Thread Specifications from http://www.gewinde-normen.de/en/loewenherz-thread.html; 2 pages.*

(Continued)

*Primary Examiner*—Charles E. Cooley
(74) *Attorney, Agent, or Firm*—A. R. Eglington

(57) ABSTRACT

In the field of continuous mixer apparatus for commingling particulate thermoplastic materials, employing at least one main rotor with a helical profile body configuration, an improved profile for the peripheral threads is provided. It presents a first upstream feed flight having a plurality of Lowenherz profile outer threads and second downstream feed flight having a plurality of screw-type outer threads, both being adjacent and integral with the periphery of the main rotor.

9 Claims, 4 Drawing Sheets

U.S. PATENT DOCUMENTS

| | | | | |
|---|---|---|---|---|
| 5,863,117 A | * | 1/1999 | Gheorghita | 366/85 |
| 6,280,074 B1 | * | 8/2001 | Kuroda et al. | 366/76.3 |
| 6,390,666 B1 | * | 5/2002 | Schafer et al. | 366/331 |
| 2006/0007777 A1 | * | 1/2006 | Ziegenfus et al. | 366/88 |

FOREIGN PATENT DOCUMENTS

| | | | |
|---|---|---|---|
| JP | 55-35959 | * | 3/1980 |
| JP | 55-35960 | * | 3/1980 |
| JP | 55-137033 | * | 10/1980 |
| JP | 56-136632 | * | 10/1981 |
| JP | 56-136633 | * | 10/1981 |
| JP | 56-158135 | * | 12/1981 |
| JP | 58-202028 | * | 11/1983 |
| JP | 61-261006 | * | 11/1986 |
| JP | 2-120006 | * | 5/1990 |
| JP | 2-263609 | * | 10/1990 |
| JP | 4-156932 | * | 5/1992 |
| JP | 6-47734 | * | 2/1994 |

OTHER PUBLICATIONS

Machinery's Handbook 26th ed. New York, Industrial Press 2000. p. 1825.*

* cited by examiner

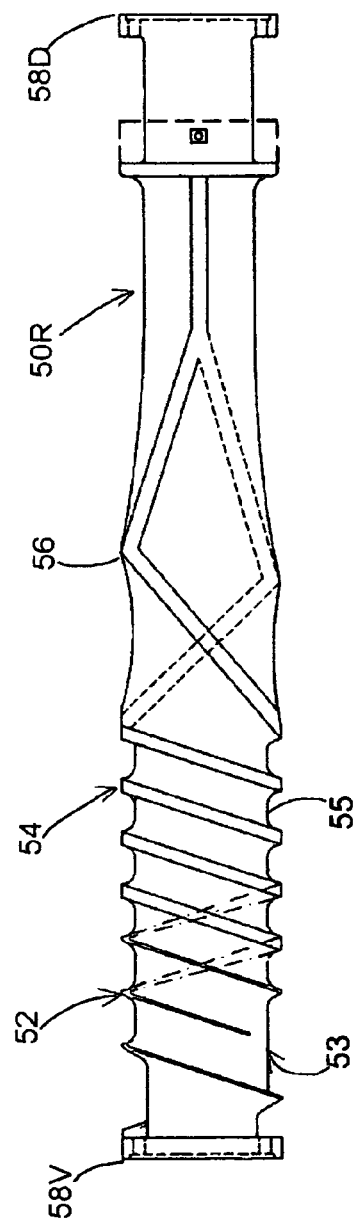
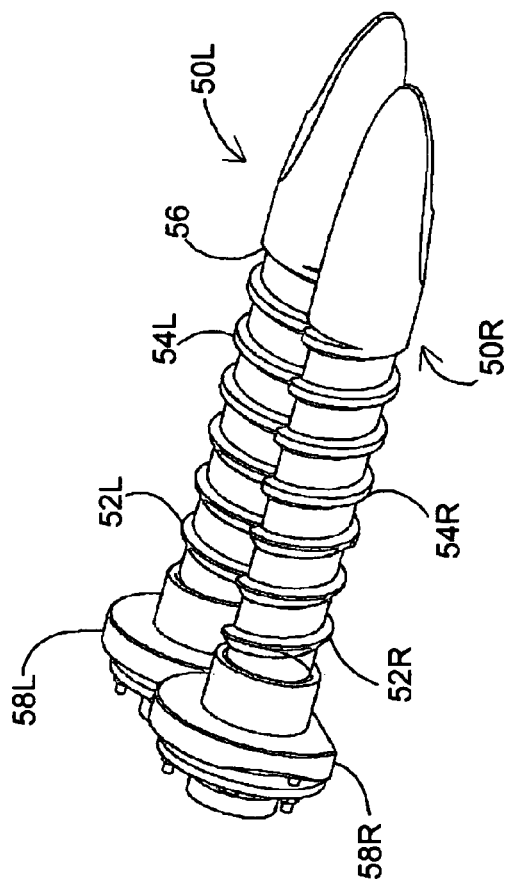

DUAL FLIGHT ROTORS FOR CONTINUOUS MIXER ASSEMBLY

CROSS-REFERENCE TO OTHER APPLICATIONS

None.

FIELD OF THE INVENTION

This is an examinable patent application under Code Section 111(a) submitted for a formal filing receipt and examination. The present invention lies in the field of plastic materials mixing in continuous mixer assemblies.

BACKGROUND OF THE INVENTION

Materials mixing rotors with standard threads, configured as depicted in prior art FIGS. 1 and 2, were seen to be breaking down, and would not run for more than a few weeks, causing down time and requiring major rotor construction, if salvageable. Such prior art rotors were wrapping molten materials about their periphery, creating pinch points, that caused the elongate rotor pairs to deflect. Such repetitive deflection eventually caused rotor cracking, and operational breakdown. Thus, the standard threaded rotor was structurally weakened and gave only limited and costly operational longevity when using standard threads on flights throughout the mixing length.

According to the present invention, an alternative configuration for the peripheral threads was devised, whereby a second and distinct set (flight) of threads were provided by adding to the threads span, and by abutting the opposite helixes, so as to help the flow of material to the helix segments of the rotors. The second flight comprises a set of Lowenherz threads, adapted to make the rotors stronger, by adding a sloped radius to the threads of the added second flight. Such will also serve to cut and churn the multi-materials being fed to the materials mixer.

The dual flight rotors of the present invention have typically operated for extended periods, without rotor flexing and associated cracking, calling only for infrequent shutdowns to change the composition of the polymer materials being processed.

Accordingly, it is a principal object of the present invention to provide a rotor assembly that avoids jamming up from fluidized partial bottom feeds so as to extend the operational range for a given sealing means and paired rotor assembly.

Another object of the invention is to modify the standard flight configuration to include a separate flight of threads, each having a linear bevel on the upstream stage for one of the flights, whereby more uniform cutting and churning of the particulate feed materials is accomplished.

It is another object of the present invention to increase the root diameter of the mixing rotor significantly, which serves to increase its structural strength and obviates its flexing from materials binding with it during processing.

A still further object of the invention is to provide improved means for the interconnection of the drive shaft and mixing rotor by adding to the drive surface provided at each longitudinal end of the rotor itself with a special keying means.

Yet another of the invention is to preclude operational failures of the mixing assembly caused by deflection of the rotor under materials compression during the vigorous mixing phase.

BRIEF DESCRIPTION OF THE DRAWING

FIG. 3 is a side elevational view of one rotor of a preferred embodiment of the dual flight, rotor set of the present invention, having a representative number of the more effective flight profiles shown in each configuration;

FIG. 5 is a perspective view of one paired set of the dual flight rotors of FIG. 3, as seen in isolation from its assembly mode, depicted for clarity of viewing;

SUMMARY OF THE INVENTION

Figure 2:
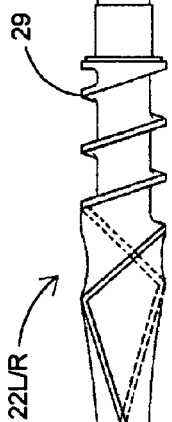
FIG. 2 is a side elevational view of a prior art, single flight rotor, seen in isolation that is employable in the prior art compact processor of FIG. 1.

Fluid materials mixing rotors can be provided with a variety of vertical cross sectional configurations on the rotors, such as the American standard thread (depicted schematically in the prior art assembly of FIG. 2). We have concluded that the publicly described, Lowenherz thread can now be usefully adapted to concurrent and advantageous with the standard thread. This is done by providing a second thread flight having the Lowenherz profile, located upstream of the standard thread flight and being integral therewith, and also somewhat extending the linear span of the dual set of peripheral threads. The Lowenherz thread has flats at the top and bottom, the same as the U.S. standard form, but the depicted angle is 53 degrees 8 minutes. The depth equals 0.75×the pitch, and the width of the flats at the top and bottom is equal to 0.125×the pitch. This screw type thread is based on the metric system and is used for measuring instruments, especially in Germany.

According to the invention, there is provided a continuous mixer apparatus adapted for commingling particulate thermoplastic material of varying polymeric compositions, and having a mixer barrel, at least one main rotor with a helical profile body section at one longitudinal end thereof, a driven journal located at an opposite end, a drive end rotor plate, a drive end packing seal retainer, and a packing gland seal means at the drive end, the improvement in the main rotor external configuration which comprises: (a) a first upstream (leading) feed flight having a plurality of Lowenherz profile threads integral with the outer periphery of the main rotor;

and, (b) a second downstream (trailing) feed flight, abutting the first flight, and having a plurality of screw-type, outer standard threads, also being integral with the periphery of the main rotor, which standard threads terminate at an abutting trailing helix flight. In a preferred embodiment, a complemental pair of modified thread rotors operate in concert, as will be shown.

DETAILED DESCRIPTION OF THE PREFERRED EMBODIMENT

Figure 1:
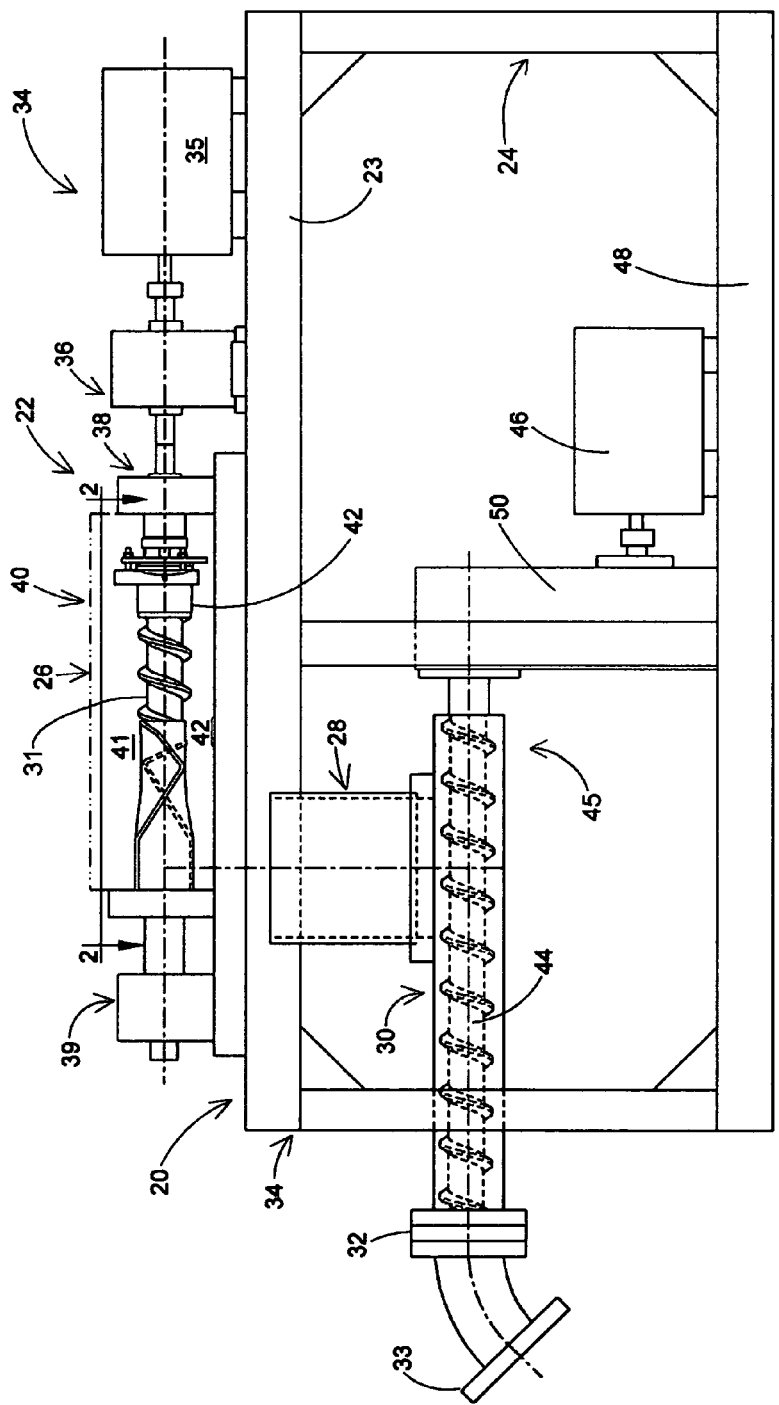
FIG. 1 is a side elevational view of a conventional compact processor for plastic particulate materials comprising a unitized particulate mixing and extrusion system, wherein particulate plastics are mixed, liquified, and the resultant molten materials are pelletized for later molding into useful articles.

With reference to FIG. 1, there is shown a prior art, compact processor 20 for plastic materials and comprising a unitized mixing and extrusion system that allows a user to customize mixing and extrusion of the plastic materials being processed. This unitized processor system comprises a two-rotor, continuous mixer 22 mounted on an upper level 23 of a framework 24. Plastic materials, fillers, additives, colorants, and the like, namely various ingredients desired to be mixed with plastic materials, as desired by the user, are introduced into a feed entrance (sometimes called a "feed throat") of the continuous mixer 22, as indicated by an arrow 26. The resulting molten plastic materials flow by gravity downward from the continuous mixer 22, like a molten "rope", descending within a vertical chute 28, into a hot-feed extruder 30. Standard screw type threads 29 (FIG. 2) are used on rotor 31. The molten output from the extruder 30 (FIG. 1) issues through an extruder head 32, which is adapted to have various types of configurations for an extrusion device 33 mounted thereon, as may be desired by the user.

For driving the two rotors of FIG. 2 (22L/R) in the mixer 22 (FIG. 1), there is shown a suitable drive system 34, such as a d.c. drive motor 35, arranged with suitable feedback speed and torque controls, as known in the art, for turning the mixer rotors preferably at predetermined constant speed. This motor 35 is coupled to a suitable speed-reducer 36, for example, such as an all helical gear, speed-reducer with two output shafts coupled to two three-piece rotors for rotating the two rotors in opposite directions about their respective longitudinal axes. In this illustrative example, the two rotors are turned in opposite directions at the even/or ratio rates.

The mixer 22 includes a drive end frame 38 (also called a "drive bearing housing assembly") for rotatably supporting a drive end journal (not seen in FIG. 1). This drive end frame 38 and its journal will be described in detail later. The mixer includes a driven end frame 39 "which may be called the "water end frame" and also may be called "driven bearing housing assembly") for rotatably supporting a driven end journal (not seen in FIG. 1). Mounted between drive and driven end frames 38, 39 is a mixer chamber barrel, or housing 40, including an upper half (chamber) 41 and a lower half (chamber) 42.

For driving an extruder molten feed screw 45 (FIG. 6) in the hot-fed extruder 30, there is shown an electric motor 46 mounted on a base 48 of vertical framework 24. This motor 46 is coupled through a suitable speed-reducer transmission 50 linked to the extruder screw 44.

The prior art rotor 31 of FIG. 1 is shown in isolation, in FIG. 2, depicting that all peripheral threads flights are of like configuration, namely they are standard, screw-type threads for kneading and admixing the feeds in the type housing 40 of FIG. 1.

Figure 4:
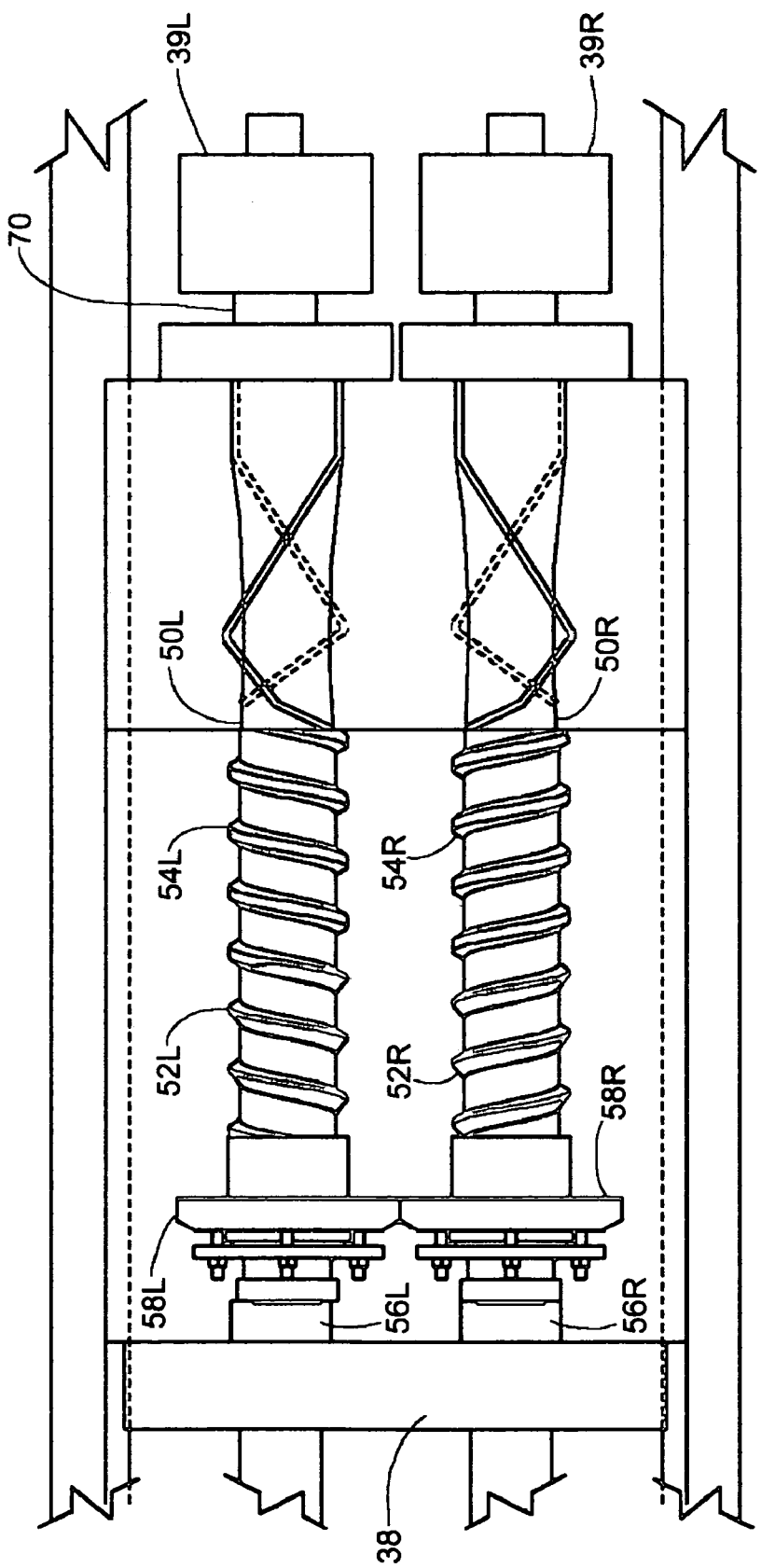
FIG. 4 is an enlarged top plan view, like that of the processor of FIG. 1, but now depicting a parallel set of material mixing, paired rotors, which rotors embody the dual flight features of the present invention first depicted in FIGS. 3.

In FIG. 3, is depicted one of the rotor pair of FIG. 4, which embraces the dual flight, set of threads of the present invention. Each of the modified rotors, like 50R, has a first upstream (proximal the driven end feed flight, 54L/R, have a plurality of Lowenherz vertical profiles 52, (see FIG. 6), disposed on rotor shaft 53, and being integral with the periphery 55 of the rotor 50R (FIG. 4).

In rotor 50R, the first feed flight 54L, has a linear span of at least one quarter of the combined feed flights linear height with reference to the surface of the main rotor external configuration.

A second downstream (distal the driven end) abuts the first flight of threads, but now presenting a standard set 54 (FIG. 6) of screw-type threads, also being integral with rotor 50R (FIG. 4).

Note that the combined feed flight and helix length is greater than 47.5 inches, as measured by the length of the flights of which the feed length component is greater than 15.75 inches.

The first and second flights are continuous in the zone of transition, varying only from the older to the newer profile. As to fabricating, the main rotor, such as 50R, is first machined with standard thread profiles, which are spaced substantially more closely, as depicted in FIGS. 3 and 5. Certain of them are then subjected to follow-on machining to 5 provide the novel flight periphery seen in FIG. 3. It is well within the skill of the rotor shaping art to produce the depicted dual flight rotor configuration of FIG. 6.

Looking to top plan view of FIG. 4, with upper barrel half 41 (FIG. 1) removed, there is shown a pair of parallel rotors (50 L/R), both positioned horizontally within housing 40 (FIG. 1), and which are denominated the left and right side mixing rotors, respectively. The left-hand, longitudinal ends of the mixing rotors are mounted conventionally in journals at the drive end, frame 38 (FIG. 4), while the drive ends each have a packing seal assembly, generally 56L/R, respectively, to be described, in connection with FIG. 4, et seq. The other longitudinal ends of the paired rotors are mounted in driven ends of the housing 39. It will be apparent that first flight of screws present the Lowenherz threads, while the abutting second flight of standard screw present the standard (squared) profile. Main rotor 50R has a major outer diameter which ranges from 8.5 to 9.5 inches.

In the top plan view of the mixer 22, cover removed, of FIG. 4 are seen the side-by-side pair of complemental rotors, 50L/R. The feed materials (not seen) are introduced into the open section of the mixing assembly (see prior art FIG. 1), and are intimately mixed as they move rightwardly, until they reach vertical chute 28, dropping therethrough into the conduit 30 containing extruder molten feed screw 44.

In the perspective of FIG. 5, are depicted dual flight rotor 50R, each having a set of Lowenherz threads, 52L/R, (three are exemplified), and an abutting downstream set, 54L/R, of standard threads (four are exemplified). The connected helix segments 56 adjoins and functionally transitioning blends with the second set of screws 54. The thoroughly mixed plastic component drops down to the extrusion stage just as depicted in FIGS. 1, and the description related thereto. The flanged, longitudinal ends 58L and 58R, are mounted as described in connection with FIG. 4.

Main rotor 50R has a major outer diameter which ranges from 8.5 to 9.5 inches.

Figure 6:
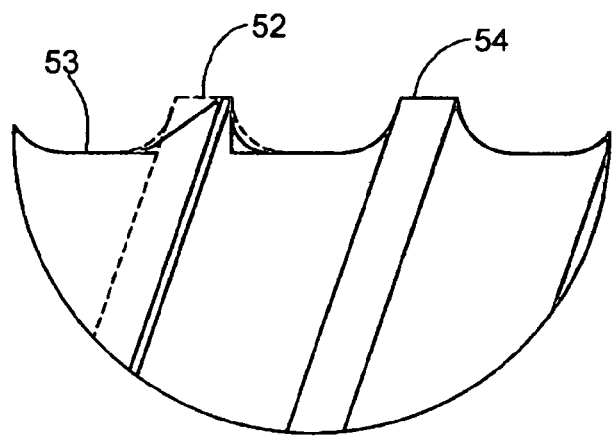
FIG. 6 is an enlarged cameo (semi-encircled) of an adjacent set of a Lowenherz modified, and a standard thread flights, better depicting the outward bevel on the set of upstream flight.

In the broken out, enlarged view of FIG. 6 there is depicted a configuration of a standard thread with the abutting Lowenherz thread of the present invention. Standard thread 54 is on the right, and the Lowenherz thread 52 is on the left. As indicated earlier, a standard thread 54 is machined, by well-known machining methods, so as to provide the thread profile of the Lowenherz thread 52.

In Table 1, there is provided the agreed specifications for the integral relationship of Lowenherz thread diameter, pitch of thread, and appropriate number of threads per linear inch. The presently preferred embodiment has the following dimensions: total flight length, 24½ inches; linear distance between adjacent thread crests, 3 inches; depths of flights relative to the root diameter of the rotor; 7¾ inches; width of crest on the standard threads, 0.75 inches; and, pitch (width of slow surface of the linear threads of 3 inches.

In a preferred embodiment, the Lowenherz threads has a diameter of 225.425 millimeters and a pitch of 76.2 millimeters while resulting threads per inch number 3.

Figure 7:
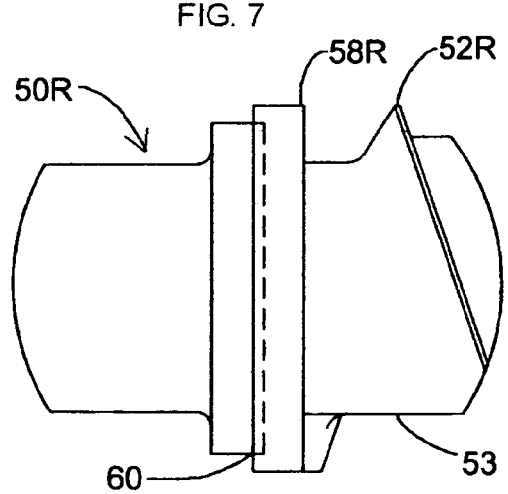
FIG. 7 is an enlarged broken out view of a flight rotor with the drive shaft engagement (and alignment) at the upstream (and similarly so at the downstream) ends of the flight rotor; and, FIGS. 8 and 9, are elevational views of the keyed driving means for each of the elongate flight rotor of FIG. 3, positioned at the upstream and downstream longitudinal ends thereof, respectively, of each of the modified flight rotor component of the present invention.

In the enlarged, broken out view of FIG. 7, such depicts the alignment configuration of the driving shaft 53 of FIG. 3 to each of the modified rotor pair 52L/R (FIG. 5) of the present invention. Note drive shaft 53 (FIG. 7) seats along recess 60, of the rotor end which is provided in the longitudinal end flange, 58R. This is reflected in the left side view of the present rotor assembly of FIG. 4.

assembly to other particulate materials with various viscosities being blended in the inventive assembly here disclosed.

With regard to the described rotor of the present invention (FIGS. 3, 4, and 5), a representative set of physical dimensions are now set forth: total body length of 56.12 inches; rotor diameter proximal the downstream end, 6.12 inches; span of the dual flight, set of threads from end flange to inception of connected helix 24.5 inches; span between apexes of adjacent lower horizontal threads, 3 inches (six inches overall)l; span between apexes of standard threads, 3 inches (nine inches overall); diameter of trough between threads, 7.37 inches; height of threads outward of rotor body, 0.75 inches; and, width of crown of standard threads, 0.75 inches. Such dimensions may be varied to accommodate the variety of plastic materials being blended and/or the volumes per unit times be effected.

TABLE 1

Lowenherz Thread Dimensions and Ratios

| Diameter | | Pitch, | Approximate No. of Threads | Diameter | | Pitch, | Approximate No. of Threads |
|---|---|---|---|---|---|---|---|
| Millimeter | Inches | Millimeter | Per Inch | Millimeter | Inches | Millimeters | Per Inch |
| 1.0 | 0.0394 | 0.25 | 101.6 | 9.0 | 0.3543 | 1.30 | 19.5 |
| 1.2 | 0.0472 | 0.25 | 101.6 | 10.0 | 0.3937 | 1.40 | 18.1 |
| 1.4 | 0.0551 | 0.30 | 84.7 | 12.0 | 0.4724 | 1.60 | 15.9 |
| 1.7 | 0.0669 | 0.35 | 72.6 | 14.0 | 0.5512 | 1.80 | 14.1 |
| 2.0 | 0.0787 | 0.40 | 63.5 | 16.0 | 0.6299 | 2.00 | 12.7 |
| 2.3 | 0.0995 | 0.40 | 63.5 | 18.0 | 0.7087 | 2.20 | 11.5 |
| 2.6 | 0.1024 | 0.45 | 56.4 | 20.0 | 0.7874 | 2.40 | 10.6 |
| 3.0 | 0.1181 | 0.50 | 50.8 | 22.0 | 0.8661 | 2.80 | 9.1 |
| 3.5 | 0.1378 | 0.60 | 42.3 | 24.0 | 0.9450 | 2.80 | 9.1 |
| 4.0 | 0.1575 | 0.70 | 36.3 | 26.0 | 1.0236 | 3.20 | 7.9 |
| 4.5 | 0.1772 | 0.75 | 33.9 | 28.0 | 1.1024 | 3.20 | 7.9 |
| 5.0 | 0.1968 | 0.80 | 31.7 | 30.0 | 1.1811 | 3.60 | 7.1 |
| 5.5 | 0.2165 | 0.90 | 28.2 | 32.0 | 1.2599 | 3.60 | 7.1 |
| 6.0 | 0.2362 | 1.00 | 25.4 | 36.0 | 1.4173 | 4.00 | 6.4 |
| 7.0 | 0.2756 | 1.10 | 23.1 | 40.0 | 1.5748 | 4.40 | 5.7 |
| 8.0 | 0.3150 | 1.20 | 21.1 | . . . | . . . | . . . | . . . |

Figure 8:
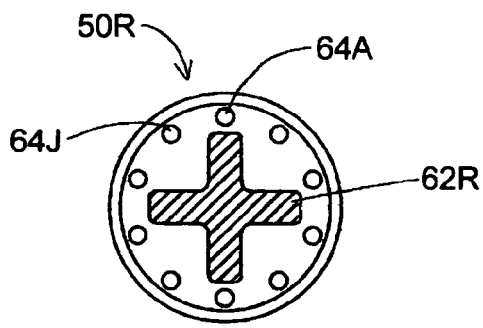
Figure 9:
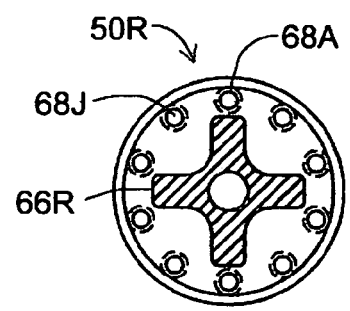

At each end of the rotor ends there are provided, specially configured recesses, or slots. In the upstream end of rotor 50R (FIG. 4) is seen a right angle, cross-type key 62R (FIG. 8), surrounded by a plurity of tapped bore holes 64A-J, for receiving the mounting bolts (not seen) on the upstream end of rotors of rotors FIG. 4.

At the downstream end of the paired rotors thereof, is provided a like right angle to cross-type key slot 66R for receiving and driving the D/S bearing shaft of 70 of FIG. 4. A similar plurality 68A-J of bore holes are provided. These keying components have been developed to provide higher torque carrying capability in the operation of the modified flight threads, rotors of the present invention. In a preferred embodiment, the total square inches of the drive key is greater than 4.5 inches.

As to a suitable packing of gland seal assembly, which is not part of the present invention, see U.S. Pat. No. 6,399,666 (May 21, 2002), which discloses such an assembly, in FIGS. 4-8 thereof, and in the associated description, being a suitable means. As to rotor dimensions, those set out below are typical of the present rotor assembly. It is well within the skill of the rotor parts machining art to modify such physical dimensions appropriately, so to adapt the approved rotor

The invention claimed is:

1. In a continuous mixer apparatus adapted for commingling particulate thermoplastic material of varying polymeric compositions, and having a mixer barrel, at least one main rotor with a helical profile body section at one longitudinal end thereof, a driven journal located at an opposite driven end, a drive end rotor plate, a drive end packing seal retainer, and a packing gland seal means at the drive end, the improvement in the main rotor external configuration which comprises:

(a) a first upstream/leading feed flight having a plurality of Lowenherz profile threads integral with the outer periphery of the main rotor; and, (b) a second downstream/leading feed flight, abutting the first feed flight and having a plurality of screw-type standard threads, also integral with the outer periphery of the main rotor, which standard threads terminate at an abutting trailing helix flight which is integral with outer periphery of the main rotor.

2. The apparatus of claim 1 wherein the first feed flight has a minimum of three Lowenherz vertical profile threads.

3. The apparatus of claim 1 wherein the second feed flight has a minimum of three standard vertical profile threads.

4. The apparatus of claim 1 wherein the combined first and second feed flights have a total linear dimension of not less than 24.5 inches.

5. The apparatus of claim 1 wherein the first feed flight has a linear span of at least one quarter of the combined feed flights linear height with reference to the surface of the main rotor external configuration.

6. The apparatus of claim 1 wherein the major outer diameter of the main rotor ranges from 8.5 to 9.5 inches.

7. The apparatus of claim 1 wherein the combined feed flight and helix linear length is greater than 47.5 inches, as measured by the length of the flights when unwound, of which the feed length component is greater than 15.75 inches.

8. The apparatus of claim 1 wherein the set of Lowenherz threads has a diameter of about 225.425 mm and a pitch of 76.2 mm resulting in about three threads per inch.

9. The apparatus of claim 1 wherein the total square inches of a drive key at the driven end of the main rotor is greater than 4.5 inches.

* * * * *